(12) United States Patent
De La Rosa et al.

(10) Patent No.: US 12,430,758 B2
(45) Date of Patent: Sep. 30, 2025

(54) COMPUTER-IMPLEMENTED METHOD, SYSTEM AND COMPUTER PROGRAM PRODUCT FOR DETERMINING A VASCULAR FUNCTION OF A PERFUSION IMAGING SEQUENCE

(71) Applicants: ICOMETRIX NV, Leuven (BE); KATHOLIEKE UNIVERSITEIT LEUVEN, Leuven (BE)

(72) Inventors: Ezequiel De La Rosa, Leuven (BE); David Robben, Hoeilaart (BE)

(73) Assignee: ICOMETRIX NV, Leuven (BE)

( * ) Notice: Subject to any disclaimer, the term of this patent is extended or adjusted under 35 U.S.C. 154(b) by 237 days.

(21) Appl. No.: 17/924,929

(22) PCT Filed: May 11, 2021

(86) PCT No.: PCT/EP2021/062561
§ 371 (c)(1),
(2) Date: Nov. 11, 2022

(87) PCT Pub. No.: WO2021/228906
PCT Pub. Date: Nov. 18, 2021

(65) Prior Publication Data
US 2024/0221151 A1 Jul. 4, 2024

(30) Foreign Application Priority Data
May 13, 2020 (EP) .................................... 20174533

(51) Int. Cl.
*G06T 7/00* (2017.01)
(52) U.S. Cl.
CPC .. *G06T 7/0012* (2013.01); *G06T 2207/10072* (2013.01); *G06T 2207/20081* (2013.01);
(Continued)

(58) Field of Classification Search
None
See application file for complete search history.

(56) References Cited

U.S. PATENT DOCUMENTS

| 8,837,800 B1 | 9/2014 | Bammer et al. |
| 2013/0011037 A1 | 1/2013 | Shi et al. |

(Continued)

FOREIGN PATENT DOCUMENTS

| KR | 102056987 B1 | 1/2020 |
| WO | 2017192629 A1 | 11/2017 |

OTHER PUBLICATIONS

Fan et al., "An Automatic Estimation of Arterial Input Function Based on Multi-Stream 3D CNN", Frontiers in Neuroinformatics, Jul. 5, 2019, vol. 13, Article 49, 11 pages.

(Continued)

*Primary Examiner* — Dov Popovici
(74) *Attorney, Agent, or Firm* — Workman Nydegger

(57) ABSTRACT

A computer-implemented method for determining a vascular function of a perfusion imaging sequence, includes the steps of: (i) receiving a perfusion imaging sequence including a voxel time series for a plurality of voxels; (ii) applying a trained classifier on the perfusion imaging sequence for receiving voxel-wise weights; (iii) receiving voxel-wise weights from the classifier; and (iv) determining the vascular function as the weighted sum of the voxel time series; wherein the classifier is trained by optimizing over the similarity between a predicted vascular function and a ground truth vascular function using a set of examples.

15 Claims, 2 Drawing Sheets

(52) U.S. Cl.
    CPC .............. *G06T 2207/20084* (2013.01); *G06T 2207/30104* (2013.01)

(56) References Cited

U.S. PATENT DOCUMENTS

| | | |
|---|---|---|
| 2014/0163403 A1 | 6/2014 | Lenox et al. |
| 2018/0260957 A1* | 9/2018 | Yang ........................ G06T 7/143 |
| 2025/0076865 A1* | 3/2025 | Dey ........................ G06N 3/092 |

OTHER PUBLICATIONS

Extended European Search Report from corresponding European Application No. EP 20174533.8, Oct. 27, 2020.
International Search Report from corresponding PCT Application No. PCT/EP2021/062561, Aug. 6, 2021.

* cited by examiner

COMPUTER-IMPLEMENTED METHOD, SYSTEM AND COMPUTER PROGRAM PRODUCT FOR DETERMINING A VASCULAR FUNCTION OF A PERFUSION IMAGING SEQUENCE

BACKGROUND

The invention relates to a computer-implemented method, a system and a computer program product for determining a vascular function of a perfusion imaging sequence.

Stroke is currently the second leading cause of mortality and the third leading cause of disability world-wide. Acute ischemic stroke therapies rely on reperfusion techniques, where the main goal is to reestablish the blood flow supply in the affected territories. In perfusion imaging, a series of images is acquired of an organ after the injection of a contrast agent or a tracer. These images show the passage of the contrast agent through the organ. The perfusion images can be thought of as a 4D volume, with three spatial dimensions and one temporal dimension. Alternatively, one could think of it as a 3D volume, within each voxel a time series, showing how the image intensity changes over time due to the contrast agent. These time series cannot be interpreted individually, as they are influenced by the contrast injection protocol and the cardiac system. However, through deconvolution analysis, these measurements can be quantified, giving physiological perfusion parameters such as blood volume, blood flow, arrival time etc.

Crucial for the deconvolution analysis is the availability of reference time series: the arterial input function (AIF) and venous output function (VOF)—or more general, vascular functions. These vascular functions are the most important inputs to the deconvolution process that the radiologist can control. Tiny changes in these functions may strongly modify the estimated perfusion maps, turning their selection of paramount importance for perfusion deconvolution.

The arterial input function is a reference time series, i.e. the time series in the feeding artery of the organ, that will be used to analyze the other time series in that organ. Historically, the location of the arterial input function needed to be indicated manually. Several patents describe techniques to automate the process of AIF selection, most of them relying on heuristic rules on how to select the correct voxel.

US 2014/0163403 A1, for example, discloses a technique to automate the process of AIF selection by extracting characteristic parameters such as maximum slope, maximum enhancement, time to peak, time to wash-out, and wash-out slope. Characteristic parameter maps are generated to show relationships among the extracted characteristic parameters, and the characteristic parameter maps are converted to a plurality of two-dimensional plots. Automated segmentation of non-AIF tissues and determination of AIF areas can be accomplished by automatically finding peaks and valleys of each phase of AIF areas on the plurality of two-dimensional plots.

Further examples for determining a vascular function in perfusion computer tomography (CTp) imaging are disclosed in US 2013/0011037 A1 and U.S. Pat. No. 8,837,800 B1, which also use rule-based approaches.

The scientific paper "An Automatic Estimation of Arterial Input Function Based on Multi-Stream 3D CNN" by Fan et al. (2019) discloses estimating an AIF based on a multi-stream 3D convolutional neural network (CNN), which combined spatial and temporal features together to estimate the AIF regions of interest (ROI). Starting with a collection of perfusion images (i.e. of multiple subjects), a ground truth AIF mask is constructed for each dataset (i.e. for each subject). This ground truth AIF mask is a binary image, stating for each voxel whether it is part of the AIF or not. Subsequently, a CNN is trained to produce such a segmentation from the perfusion images. The training is performed by performing gradient descent on the similarity of the ground truth function and a predicted AIF mask. The trained CNN can be used to segment unseen perfusion images. The resulting AIF mask is used to finally produce the AIF as the mean time series of all selected voxels. Thus, Fan et al. proposes a supervised segmentation approach for determining a vascular function of a perfusion imaging sequence.

The approach based on supervised segmentation is technically challenging and has limited similarity to clinical practice. Estimating vascular functions by segmenting a specific vessel's ROI might spatially constrain the voxel candidates to suboptimal function selection. AIF/VOF selection is mainly conducted in clinical practice based on the vessels time-series profiles, and hence for each patient a specific vessel and ROI would be suitable depending on the clot location, the affected brain hemisphere, and the vessels signal's quality (SNR, peak-concentration value, arrival time, partial-volume-effect, etc.). Furthermore, the creation of the ground truth AIF mask requires to manually indicate for each voxel whether it is part of the ROI or not, which is a tedious task for large 3D volumes. Attempting to indicate just a single or a few voxels as the AIF mask (as one would do in clinical practice for perfusion analysis) would be insufficient as the ground truth now contains many false negative voxels, affecting the training of the network.

Thus, the objective technical problem to be solved by the invention is to enhance the determination of the vascular function and to simplify the task of a human rater.

SUMMARY

The problem is solved by the invention according to the independent claims. Preferred embodiments are described in the dependent claims.

In a first aspect, the invention relates to a computer-implemented method for determining a vascular function of a perfusion imaging sequence, comprising the steps of:
  i. receiving a perfusion imaging sequence comprising voxel time series for a plurality of voxels;
  ii. applying a trained classifier on the perfusion imaging sequence for yielding voxel-wise weights;
  iii. receiving voxel-wise weights from the classifier; and
  iv. determining the vascular function as the weighted sum of the voxel time series;

wherein the classifier is trained by optimizing over the similarity between a predicted vascular function and a ground truth vascular function using a set of examples.

A vascular function indicates the concentration of a tracer or contrast agent within blood feeding areas over time. A perfusion imaging sequence is a series of images, which are acquired of an organ after the injection of the contrast agent. The perfusion imaging sequence may be obtained by magnet resonance tomography (MRT) or perfusion computer tomography (CTp). The contrast agent used may be a Gadolinium contrast agent for MRT and an Iodine contrast agent for CTp. The contrast agent causes a change of the detection, which can be translated into a contrast agent concentration.

A voxel refers to a value on a regular grid in three-dimensional space. As with pixels in a 2D bitmap, voxels themselves do not typically have their position (coordinates) explicitly encoded with their values. Instead, rendering systems can infer the position of a voxel based upon its position relative to other voxels.

Within the framework of this invention, a plurality of voxels means at least two voxels. Thus, a plurality of voxels may comprise a grid with between 60×60×1 and 2048×2048×1280 voxels and preferably between 256×256×2 and 512×512×320 voxels. In a most preferred embodiment, the plurality of voxels comprises images having 256×256 pixels in 2 to 80 slices. Preferably, the perfusion imaging series comprises 10 to 120 images acquired in 40 to 120 seconds.

Within the framework of this invention, a classifier is an algorithm that implements classification. Preferably, the classifier is implemented as a machine learning algorithm and executed by a processing unit comprised in a system for determining a vascular function of a perfusion imaging sequence.

Within the framework of this invention, the voxel-wise weights mean a plurality of weights, wherein each of the voxels is assigned to one of the weights and each of the weights is assigned to one of the voxels respectively. Thus, the assignment of the voxels and the weights is bijective.

Preferably, the classifier is trained by optimizing over the similarity between a predicted vascular function and a ground truth vascular function using a set of examples. In other words, the training comprises a minimization of the difference between the predicted vascular function and a ground truth vascular function.

The term "ground truth" refers to a conceptual term relative to the knowledge of the truth concerning a specific question, i.e. the ideal expected result. The ground truth vascular function may be determined by a human rater or another reliable determination process.

The claimed method avoids constraining the selection of the vascular function to the ROI, i.e. the vessels labeled by the human rater in the training images. Instead, the full image and thus all voxel time series are used as an input for determining the vascular function. This prevents suboptimal function or ROI selection and facilitates ground truth annotation. The human rater only has to choose the training images and their "ground truth" vascular function instead of indication for each voxel whether it is part of the ROI or not. After the classifier is trained properly, the method may be executed automatically.

In an embodiment, the vascular function is the arterial input function (AIF) or venous output function (VOF). The AIF indicates the time series of the concentration of a contrast agent in the feeding artery of the examined organ. The VOF indicates the time series of the concentration of a contrast agent in the draining vein of the organ.

Preferably, each time point $y_i$ is represented as a weighted average of all voxels of the volume $x_i$ for predicting the vascular function y. For any time point i the vascular function may be:

$$y_i = \text{sum}(x_i * P_{vol})$$

$$y_i = \sum_{k=1}^{K}\sum_{n=1}^{N}\sum_{m=1}^{M} x(m, n, k)_i P_{vol}(m, n, k)$$

where $P_{vol}$ is the 3D probabilistic volume accounting with the voxel-wise contribution to the vascular function. The advantage of the averaging step is that the resulting AIF will have a higher signal-to-noise ratio than a single voxel.

In an embodiment, the voxel-wise weights are normalized. Preferably, the voxel-wise weights are normalized to 1.

$$\sum_{k=1}^{K}\sum_{n=1}^{N}\sum_{m=1}^{M} P_{vol}(m, n, k) = 1$$

Advantageously, the normalization of the weights may give relative weights for the voxels making them more comparable. Furthermore, the normalization may compensate a partial volume effect, which occurs for activity in small objects or regions because of the limited resolution of the imaging system in medical imaging.

In an embodiment, the classifier is a first artificial neural network. Preferably, the artificial neural network is a convolutional neural network (CNN).

A CNN consists of an input and an output layer, as well as multiple hidden layers. The hidden layers of a CNN typically consist of a series of convolutional layers that convolve with a multiplication, another dot product, for example a sliding dot product, or a cross-correlation. It affects how a weight is determined at a specific index point.

The input of a CNN is a tensor with the shape (number of images)×(image width)×(image height)×(image depth). The image depth may also be expressed as slices. Preferably, 60 images per minute are used, wherein each image having 256×256 pixels (width and height) and 2 to 80 slices. Although, more or less images per minute, larger or smaller images or more or less slices may be used.

After passing through a convolutional layer, the image becomes abstracted to a feature map, with the shape (number of images)×(feature map width)×(feature map height)×(feature map depth)×(feature map channels).

Convolutional layers convolve the input and pass its result to the next layer. Although fully connected feedforward neural networks can be used to learn features as well as classify data, it is more advantageous to apply a CNN to images than applying a common artificial neuronal network. When applying a CNN, the number of needed neurons is lower for large input sizes associated especially with images or 3D data, for which each pixel or voxel is a relevant variable. The convolution operation brings a solution to this problem as it reduces the number of free parameters, allowing the network to be deeper with fewer parameters.

In an embodiment, the first artificial neural network uses a spatial normalization. Preferably, the spatial normalization is a Softmax operation. The Softmax operation may be implemented as a dedicated Softmax layer implementing only the Softmax operation.

The Softmax layer is a layer implementing a Softmax function. Within the framework of the invention, the Softmax function is a function that takes as input a vector of n real numbers and normalizes it into a probability distribution consisting of n probabilities proportional to the exponentials of the input numbers.

In an embodiment, the training of the classifier is an indirect training comprising creating a second artificial neural network and optimizing the second artificial neural network over the similarity between a predicted vascular function and a ground truth vascular function using a set of examples. In this embodiment, the second artificial neural network comprises the first artificial neural network. The second neural network uses the output weights of the first neural network to determine the vascular function.

During training, the output of the second neural network, i.e. the vascular function, is compared to the ground truth vascular function. If the similarity is low, the determination of the voxel-wise weights was not optimal and the nodes within the second and thus, within the first neural network were adapted until vascular functions with a higher similarity to the ground truth vascular function are output.

Preferably, the second artificial neural network is a larger artificial neural network than the first artificial neural network, i.e. it has more neurons and/or more layers. Preferably, the first artificial neural network is implemented as a layer, a neuron or more generally as a part of the second neural network.

Advantageously, the optimizing of the second artificial neural network allows end-to-end gradient-based optimization of the weights of the classifier by optimizing the similarity between the predicted vascular function and the ground truth vascular function.

In an embodiment, the similarity is determined as the correlation between the predicted vascular function and the ground truth vascular function. Preferably, the similarity metric is a Pearson correlation using the Pearson correlation coefficient.

The Pearson correlation coefficient L is a measure of the linear correlation between two variables, i.e. the predicted vascular function and the ground truth vascular function. According to the Cauchy-Schwarz inequality, it has a value between +1 and −1, where +1 is total positive linear correlation, 0 is no linear correlation, and −1 is total negative linear correlation. Thus, for optimizing over the similarity between the predicted vascular function and the ground truth vascular function L should be close to +1.

Preferably, the Pearson correlation coefficient L is determined by $$L = -\frac{\sum_{i=1}^{n}(y_i - \bar{y})(y_{pred_i} - \bar{y}_{pred})}{\sqrt{\sum_{i=1}^{n}(y_i - \bar{y})^2}\sqrt{\sum_{i=1}^{n}(y_{pred_i} - \bar{y}_{pred})^2}}$$

wherein y is the ground truth vascular function and $y_{pred}$ is the predicted vascular function.

In an alternate embodiment, the similarity is determined using a mean squared error.

In another aspect the invention relates to a system for determining a vascular function of a perfusion imaging sequence, the system comprising means for receiving a perfusion imaging sequence, wherein the perfusion imaging sequence comprises time series for a plurality of voxels. The system further comprises a trained classifier, wherein the classifier is configured to determine voxel-wise weights from the perfusion imaging sequence. The classifier is trained by optimizing over the similarity between a predicted vascular function and a ground truth vascular function using a set of examples. The system further comprises means for applying the trained classifier on the perfusion imaging sequence for receiving voxel-wise weights and means for determining the vascular function as the weighted sum of the voxel time series.

In an embodiment, the system further comprises at least one processing unit and means for performing the aforementioned method.

The processing unit may preferably be a graphics processing unit (GPU), a central processing unit (CPU) or any other suitable processing unit.

In an embodiment, the classifier is implemented as a first artificial neural network comprising a plurality of layers. Artificial neuronal networks are preferred machine learning algorithms used for pattern recognition and signal classification.

In an embodiment, the plurality of layers comprises a last layer configured to output the voxel-wise weights, wherein the last layer is a spatial Softmax layer for normalizing the voxel-wise weights spatially.

In an embodiment, the system further comprises a second artificial neural network, wherein the first artificial neural network is a part of the second artificial neural network and the classifier is trained indirectly by optimizing the second artificial neural network over the similarity between a predicted vascular function and a ground truth vascular function using a set of examples.

In an embodiment the first artificial neural network is implemented as a convolutional neural network, wherein the convolutional neural network comprises K convolutional layers $L_1$ to $L_K$, wherein each layer $L_k$ comprises $2^{3+k}$ filters having a 3×3×3 kernel.

Preferably, the kernels are symmetric. Although, the kernels may be bigger or smaller. Thus, the layers may comprise more or less than $2^{3+k}$ filters. Since deeper layers have to represent a wider spatial context, more filters do not have a beneficial effect.

K may be any integer defining the total number of convolutional layers. For example, without being limited to that, K may be 1, 3, 4, 5, 10 or more. The higher K, the more sensible would the method be. Although the higher K requires more memory.

In an embodiment, the convolutional neural network further comprises an extra convolution layer behind the K convolutional layers with only one filter. The extra convolutional layer maps the preceding layers to a single probabilistic volume.

In another aspect, the invention relates to a computer program product for determining a vascular function of a perfusion imaging sequence comprising computer readable instructions for causing the system according to an embodiment of the invention to execute the method according to an embodiment of the invention.

BRIEF DESCRIPTION OF THE DRAWINGS

The present invention is described in detail with reference to the examples shown in the drawings, in which the following is shown.

DETAILED DESCRIPTION OF VARIOUS EMBODIMENTS

Figure 1:
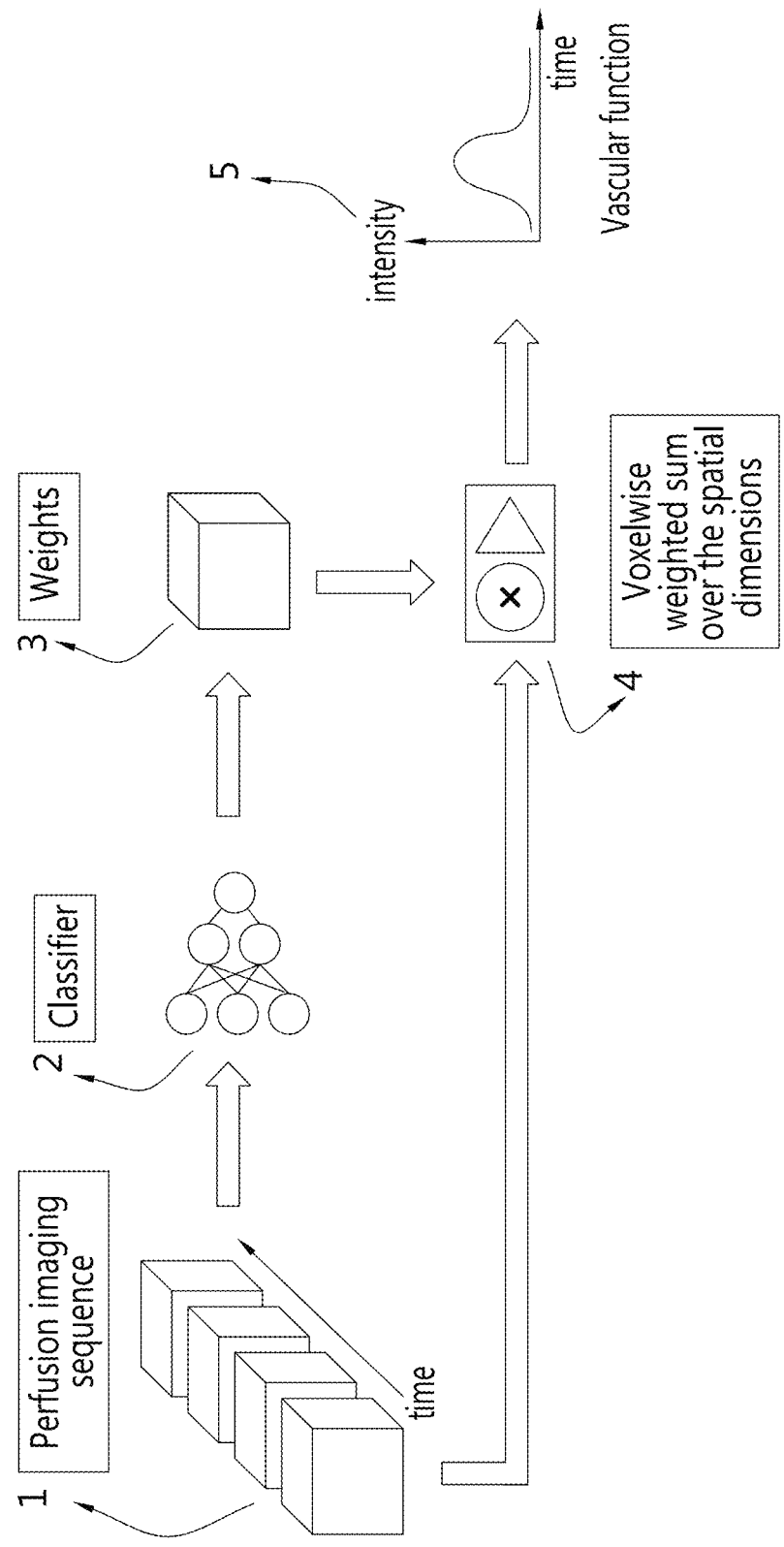
FIG. 1 a schematic view of an embodiment.

FIG. 1 depicts a schematic view of an embodiment of the suggested method. At first, a perfusion imaging sequence 1 is provided. The perfusion imaging sequence 1 comprises a sequence of perfusion images, each image comprising three spatial dimensions. In alternate embodiments, the perfusion images may comprise only two spatial dimensions.

Each image is divided in elements of homogenous size, voxels. For example, each image comprises 256×256×2 voxels. Although larger or smaller images in any direction may be possible. Preferably, the perfusion imaging sequence 1 comprises between 10 and 120 images.

Preferably, the perfusion imaging sequence 1 is taken in between 40 and 120 seconds. Thus, the perfusion imaging sequence 1 comprises between 0.08 and 3 images per second.

A trained classifier 2 is applied to the perfusion imaging sequence 1. The classifier is preferably trained by optimization through backpropagation of the similarity between a predicted vascular function, i.e. the output, to a ground truth vascular function, i.e. the real vascular function of a set of examples. The ground truth vascular function may be determined by a human rater or another reliable determination process.

Applying the perfusion imaging sequence 1 to the classifier 2 results in voxel-wise weights 3. In other words, the classifier 2 outputs a weight 3 for each voxel of each image of the perfusion imaging sequence 1.

All voxel time series are weighted and added up. Thus, the weighted sum 4 of the voxel time series is determined. The weighted sum 4 gives the vascular function 5, which is the function of the intensity of a contrast agent within the blood over time.

Figure 2:
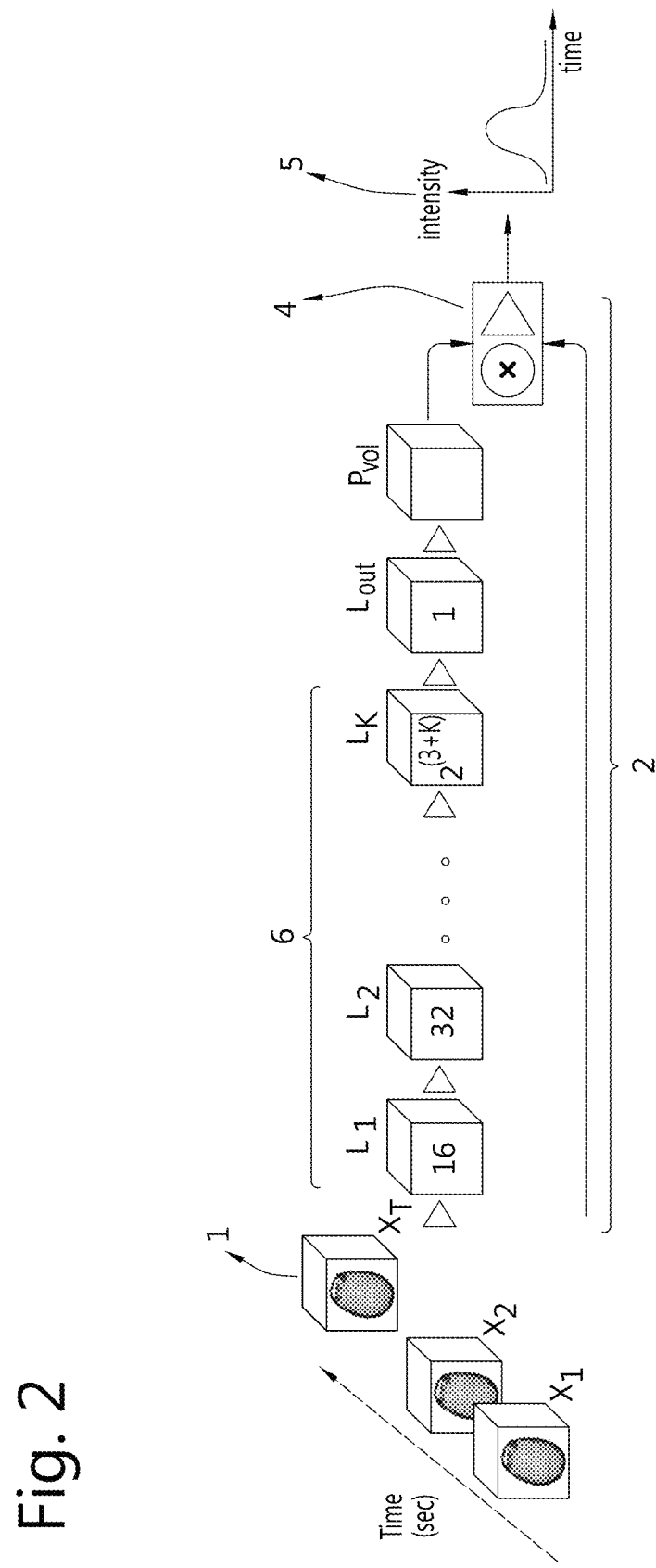
FIG. 2 a schematic view of an embodiment with higher detail to the classifier.

FIG. 2 shows a schematic view of the classifier 2. In this embodiment, the classifier 2 is a convolutional neural network. As described above, the classifier receives the perfusion imaging sequence 1. The perfusion imaging sequence 1 comprises a time series of images $x_1$ to $x_T$. From these images, the classifier 2 determines voxel-wise weights for adding the weighted voxels to the weighted sum in the time series representing the vascular function $y_{pred}$.

The classifier comprises K convolutional layers 6 ($L_1$ to $L_K$). Each Layer $L_k$ comprises $2^{(3+k)}$ filters, one for every input channel of the input images or the preceding layer. Thus, the first layer $L_1$ comprises $2^4=16$ filters, the second layer $L_2$ comprises $2^5=32$ filters and so on.

The classifier 2 further comprises an extra convolutional layer Lout with only one filter. The extra convolutional layer Lout maps the convolutional layers to a single probabilistic volume.

The last layer of the classifier 2 is a layer for normalizing the voxel-wise weights spatially $P_{vol}$. The last layer may preferably be a Softmax layer implementing a Softmax operation for spatially normalizing the voxel-wise weights. The normalized weights are output to means for determining the weighted sum 4 and thus, the vascular function 5.

The invention claimed is:

1. A computer-implemented method for determining a vascular function of a perfusion imaging sequence, comprising the steps of:
   i. receiving a perfusion imaging sequence comprising voxel time series for a plurality of voxels;
   ii. applying a trained classifier on the perfusion imaging sequence for receiving voxel-wise weights;
   iii. receiving the voxel-wise weights from the classifier; and
   iv. determining the vascular function as a weighted sum of the voxel time series;
   wherein the classifier is trained by optimizing over a similarity between a predicted vascular function and a ground truth vascular function using a set of examples.

2. The method according to claim 1, wherein the vascular function is an arterial input function or venous output function.

3. The method according to claim 1, wherein the voxel-wise weights are normalized.

4. The method according to claim 1, wherein the classifier is a first artificial neural network.

5. The method according to claim 4, wherein the first artificial neural network uses a spatial normalization, wherein the spatial normalization is a Softmax operation.

6. The method according to claim 4, wherein the training of the classifier further is an indirect training comprising creating a second artificial neural network and optimizing the second artificial neural network over the similarity between the predicted vascular function and the ground truth vascular function using the set of examples,
   wherein the second artificial neural network comprises the first artificial neural network.

7. The method according to claim 4, where the similarity is determined as a correlation between the predicted vascular function and the ground truth vascular function.

8. A system for determining a vascular function of a perfusion imaging sequence, the system comprising:
   means for receiving a perfusion imaging sequence, wherein the perfusion imaging sequence comprises voxel time series for a plurality of voxels;
   a trained classifier, wherein the classifier is configured to determine voxel-wise weights from the perfusion imaging sequence,
   wherein the classifier is trained by optimizing over a similarity between a predicted vascular function and a ground truth vascular function using a set of examples;
   means for applying the trained classifier on the perfusion imaging sequence for receiving the voxel-wise weights and
   means for determining the vascular function as a weighted sum of the voxel time series.

9. The system according to claim 8, wherein the system further comprises:
   at least one processing unit; and
   means for performing a computer-implemented method for determining the vascular function of the perfusion imaging sequence, comprising the steps of:
   i. receiving the perfusion imaging sequence comprising the voxel time series for the plurality of voxels;
   ii. applying the trained classifier on the perfusion imaging sequence for receiving the voxel-wise weights;
   iii. receiving the voxel-wise weights from the classifier; and
   iv. determining the vascular function as the weighted sum of the voxel time series;
   wherein the classifier is trained by optimizing over the similarity between the predicted vascular function and the ground truth vascular function using the set of examples.

10. The system according to claim 8, wherein the classifier is implemented as a first artificial neural network comprising a plurality of layers.

11. The system according to claim 10, wherein the plurality of layers comprises a last layer (Pvol) configured to output the voxel-wise weights,
    wherein the last layer is a spatial Softmax layer for normalizing the voxel-wise weights spatially.

12. The system according to claim 10, wherein the system further comprises a second artificial neural network,
    wherein the first artificial neural network is a part of the second artificial neural network and the classifier is trained indirectly by optimizing the second artificial neural network over the similarity between the predicted vascular function and the ground truth vascular function using the set of examples.

13. The system according to claim 10, wherein the first artificial neural network is implemented as a convolutional neural network,
    wherein the convolutional neural network comprises K convolutional layers L1 to LK,
    wherein each layer Lk comprising 23+k filters having a 3×3×3 kernel.

14. The system according to claim 13, wherein the convolutional neural network further comprises an extra convolution layer, Lout, behind the K convolutional layers with only one filter.

15. A non-transitory computer readable storage medium comprising a computer program product for determining a vascular function of a perfusion imaging sequence comprising computer readable instructions for causing the system according to claim 8 to execute a computer-implemented method for determining the vascular function of the perfusion imaging sequence, comprising the steps of:
   i. receiving the perfusion imaging sequence comprising the voxel time series for the plurality of voxels;
   ii. applying the trained classifier on the perfusion imaging sequence for receiving the voxel-wise weights;
   iii. receiving the voxel-wise weights from the classifier; and
   iv. determining the vascular function as the weighted sum of the voxel time series;

wherein the classifier is trained by optimizing over the similarity between the predicted vascular function and the ground truth vascular function using the set of examples.

* * * * *